US 6,643,523 B2

(12) United States Patent
Goetz (10) Patent No.: US 6,643,523 B2
(45) Date of Patent: *Nov. 4, 2003

(54) ALTERNATIVE ROUTING SYSTEM FOR MOBILE TELEPHONE CALLS

(75) Inventor: Ian Goetz, Ipswich (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 142 days.

(21) Appl. No.: 09/043,408
(22) PCT Filed: Feb. 27, 1997
(86) PCT No.: PCT/GB97/00559

§ 371 (c)(1),
(2), (4) Date: Mar. 18, 1998

(87) PCT Pub. No.: WO97/36442

PCT Pub. Date: Oct. 2, 1997

(65) Prior Publication Data

US 2003/0114186 A1 Jun. 19, 2003

(30) Foreign Application Priority Data

Mar. 26, 1996 (EP) ............................................. 96302059
Mar. 26, 1996 (GB) .............................................. 9606296

(51) Int. Cl.[7] ................................................. H04Q 7/20
(52) U.S. Cl. ....................... 455/557; 455/74.1; 455/445
(58) Field of Search ................................. 455/552, 566, 455/74.1, 426, 445, 462, 465, 557, 449, 450, 463

(56) References Cited

U.S. PATENT DOCUMENTS 4,686,671 A    8/1987   Burian et al.

(List continued on next page.)

FOREIGN PATENT DOCUMENTS

CA             2168961        12/1995

(List continued on next page.)

OTHER PUBLICATIONS

IBM Technical Disclosure Bulletin, vol. 38, No. 6, Jun. 1995, Armonk, NY, US, pp. 491–439, "Method for Audio Multiplexing and Control".

(List continued on next page.)

Primary Examiner—William Trost
Assistant Examiner—Philip J. Sobutka
(74) Attorney, Agent, or Firm—Nixon & Vanderhye P.C.

(57) ABSTRACT

A cellular telephone is provided with a connector for connecting it to an interface unit. The interface unit can exchange speech and data signals with the telephone as well as providing power. When the telephone is connected to the interface unit, its antenna is effectively disabled. The interface unit provides a link between the telephone and a BTS via a communication path other than the cellular telephone system's conventional cell arrangement. The communication path can include telephone or ISDN connections, leased lines, point-to-point microwave links or coaxial cable. In the cases of telephone and ISDN lines and leased lines, baseband speech and data signals pass between the telephone and the interface unit and a modem is used to transmit and receive these signals over the communication path. If a microwave link or coaxial cable is used, RF speech and data signals may be passed between the telephone and the interface unit. A single interface unit may be used to provide connections for a plurality of telephones.

28 Claims, 9 Drawing Sheets

U.S. PATENT DOCUMENTS

| | | | |
|---|---|---|---|
| 4,790,000 A | * 12/1988 | Kinoshita | 455/449 |
| 4,989,230 A | * 1/1991 | Gillig et al. | 379/59 |
| 5,127,042 A | * 6/1992 | Gillig et al. | 379/59 |
| 5,157,660 A | 10/1992 | Kuwahara et al. | |
| 5,402,523 A | * 3/1995 | Berg | 455/450 |
| 5,406,615 A | * 4/1995 | Miller, II et al. | 379/59 |
| 5,450,472 A | 9/1995 | Brax | |
| 5,526,403 A | * 6/1996 | Tam | 379/59 |
| 5,533,099 A | * 7/1996 | Byrne | 379/58 |
| 5,594,782 A | * 1/1997 | Zicker et al. | 379/63 |
| 5,636,264 A | * 6/1997 | Sulavuori et al. | 379/56 |
| 5,675,629 A | * 10/1997 | Raffel et al. | 379/58 |
| 5,903,835 A | * 5/1999 | Dent | 455/427 |
| 5,983,098 A | * 11/1999 | Gerszberg et al. | 455/426 |
| 6,002,937 A | * 12/1999 | Young et al. | 455/74.1 |

FOREIGN PATENT DOCUMENTS

| | | |
|---|---|---|
| CA | 2190630 | 12/1995 |
| EP | 660 628 | 6/1995 |
| WO | 94 30028 | 12/1994 |

OTHER PUBLICATIONS

IBM Technical Disclosure Bulletin, vol 38, No. 10, Oct. 1, 1995, Armonk, NY, US, pp. 451–452, "Modem Signal Path Control".

* cited by examiner

ALTERNATIVE ROUTING SYSTEM FOR MOBILE TELEPHONE CALLS

This application is the U.S. national phase application of International Patent Application No. PCT/GB97/00559, filed Feb. 27, 1997.

BACKGROUND OF THE INVENTION

The present invention relates to cellular telephone systems, and particularly to the provision of a communication path between a mobile telephone and a cellular telephone call-switching system. A cellular telephone system has a system of "cells" which are geographical areas, each of which is associated with a radio base station. As the mobile unit moves from one cell to another, radio contact is 'handed-over' from one radio base station to another.

FIELD OF THE INVENTION

As the usage of mobile telephones increases, the provision of acceptable quality of service to subscribers becomes increasingly difficult as the demand for radio channels exceeds the availability of channels allocated to network operators. The allocation of radio frequency (r.f.) spectrum to different services is carried out by national governments which operate within the framework set by the WARC (World Administrative Radio Conference). Furthermore, expansion of the allocated band beyond a certain size would cause technical problems for the design of mobile telephones. In particular, there would be the problem of providing effective broadband frequency synrthesizers, r.f. amplifiers and antennas.

RELATED ART

It is an aim of the present invention to overcome the aforementioned problem by providing an additional communication path independent of the system of cells of the cellular telephone system. It is known to provide a mobile telephone which is also capable of operation according to a cordless radio standard (e.g. DECT) to a nearby radio base station, or to a fixed (PSTN) line dedicated to the user or a specified group of users. Examples of the latter are to be found in IBM Technical Disclosure Vol 38 No 6 and European patent Application EP0660628 (Nokia), both published in 1995. However, such systems require a separate user subscription on the fixed network, and an associated separate network identity (telephone number), requiring call diversion arrangements to be set up to allow the user to be contacted. The cordless examples also require their own allocation of radio frequency spectrum, and so they do not overcome the fundamental problem of limited radio spectrum.

SUMMARY OF THE INVENTION

According to a first aspect of the invention, there is provided a cellular telephone system comprising an additional communication path independent of the system of cells of the cellular telephone system, between a mobile telephone and a cellular telephone call-switching system, the communication path comprising an interface means for providing a communications connection between a mobile telephone and the cellular telephone call-switching system so as to by-pass the telephone's radio antenna.

In another aspect, the invention comprises an interface apparatus for providing a communications connection between a mobile telephone and a cellular telephone call-switching system so as to by-pass the telephone's radio antenna, the apparatus comprising a first connector for exchanging speech and data signals with a cellular mobile telephone, a second connector for connecting the apparatus to a transmission line, and means for exchanging said speech and data signals via the second connector.

In a further aspect, the invention comprises a telephone for a cellular telephone system including processing circuitry and an externally accessible connector, the connector being coupled to the processing circuitry to exchange baseband speech and data signals therewith, and having radio frequency transceiver circuitry for coupling to the processing circuitry to exchange baseband speech and data signals therewith, the processing circuitry including means for detecting whether the externally accessible connector is in communication with a complementary connector, and switch means under the control of the processing circuitry to disconnect the processing circuitry from the transceiver circuitry when the externally accessible connector is so connected wherein the first connector communicates with the mobile telephone by means of art electrical connection, further comprising a power supply connection for supplying electrical power to the mobile telephone through the electrical connection.

Preferably, such a telephone includes r.f. circuitry for transmitting and receiving speech and data signals, and a further externally accessible connector and switching means, wherein the switching means is responsive to a signal applied to the further connector to disable the r.f. circuitry.

In a further aspect, the invention comprises a method of connecting a mobile telephone to the call-switching system of a cellular telephone system comprising the step of establishing an additional communication path, independent of the system of cells of the cellular telephone system, between the mobile telephone and a fixed part of the cellular telephone system, by putting the mobile telephone in communication with an interface means, the interface means being connected to the call-switching system of the cellular telephone system by a communications path.

The interface apparatus may provide a communications connection to the mobile telephone for baseband speech and control data signals. In this case, the interface means may comprise a modem for transmitting the speech and control data over longer distances. The modem may include dialling means so that a switched network, e.g. PSTN (public switched telephone network) or ISDN (integrated services digital network), may be used for the communications path. Alternatively, the communications path may comprise a fixed point-to-point signal path. This could be a leased line, a permanent ISDN connection, a cable television (CATV) transmission line or a microwave link.

Advantageously, the interface means is arranged for connecting a plurality of mobile telephones to the call switching system and the bandwidth of the communications path is sufficient for a plurality of simultaneous calls.

In order for the present invention to be implemented with existing mobile telephone equipment, the interface means may provide a connection with the r.f. circuitry of a mobile telephone, for carrying r.f. speech and data signals. Some handheld telephones are already provided with an r.f. connector to enable them to be used with adaptors for vehicle-mounted operation.

Preferably, the communication path includes a transmission line and the interface means comprises means for connecting the telephone's r.f. circuitry to the transmission line. More preferably, the communication path comprises a point-to-point microwave link and transposer means for transposing the signals on the transmission line to the operating band of the microwave link and transposing signals received from the microwave link to the operating band of the mobile telephone and applying them to the transmission line. Thus, the telephone and a BTS (base transceiver site) substitute, providing connection to the mobile telephone call switching system, may both operate with substantially unchanged software. In practice, only the BTS software would need to be changed and then primarily only in respect of the control of its frequency synthesizers. However, even this change could be avoided if a transposer means were to be used at the BTS. If the "BTS" is connected directly to the transmission line, the transposer means can be dispensed with.

Advantageously, the interface means provides a communications connection to the transmission line from the r.f. circuitry of a plurality of mobile telephones.

Preferably, the interface means is provided with user input means to enable the telephone or ISDN (Integrated Services Digital Network) number of a BTS to be entered. In the simplest case, this could merely be a numerical key pad. However, the service provider may wish to keep the telephone or ISDN numbers of its BTSs secret. In this case, the interface means could be programmed with a table of encrypted numbers. The correct number could then be retrieved and decrypted on the basis of a postcode or zip code entered by a user. A further option would be for the user to be instructed to call a central station using his mobile telephone. The cellular system can identify the location of the mobile telephone in the cellular network and can then download the correct BTS telephone number or ISDN number to the mobile telephone. Connecting the mobile telephone to the interface means for the first time would cause the mobile telephone to transfer the downloaded number to the interface means.

In a multi-user embodiment, the interface apparatus may comprise one or more further communications connectors for receiving baseband speech and data signals from one or more further cellular mobile telephones, and a multiplexer for multiplexing signals from the first and further connectors, the modem being arranged for transmitting the output of the multiplexer.

Preferably, the interface apparatus includes control means and dialling means, wherein the control means is responsive to cellular telephone data signals from the first connector (and further connectors, if provided) to cause the dialling means to output telephone or ISDN dialling signals via the second connector.

In most of the embodiments to be described below, a mechanical/electrical plug and socket connection is used to provide the communications connection between the telephone and interface unit, which may also provide a power supply to the telephone. However, connection may instead be provided by means of an optical (e.g. infra-red) or ultrasonic beam, carrying either a digital signal (e.g. according to the IrDA (Infra-red data access) standard, originally developed for use in connecting portable computers to printers etc), or an analogue signal.

BRIEF DESCRIPTION OF THE INVENTION

Embodiments of the present invention will now be described, by way of example, with reference to the accompanying drawings, in which.

DETAILED DESCRIPTION OF EXEMPLARY EMBODIMENT

Figure 1:
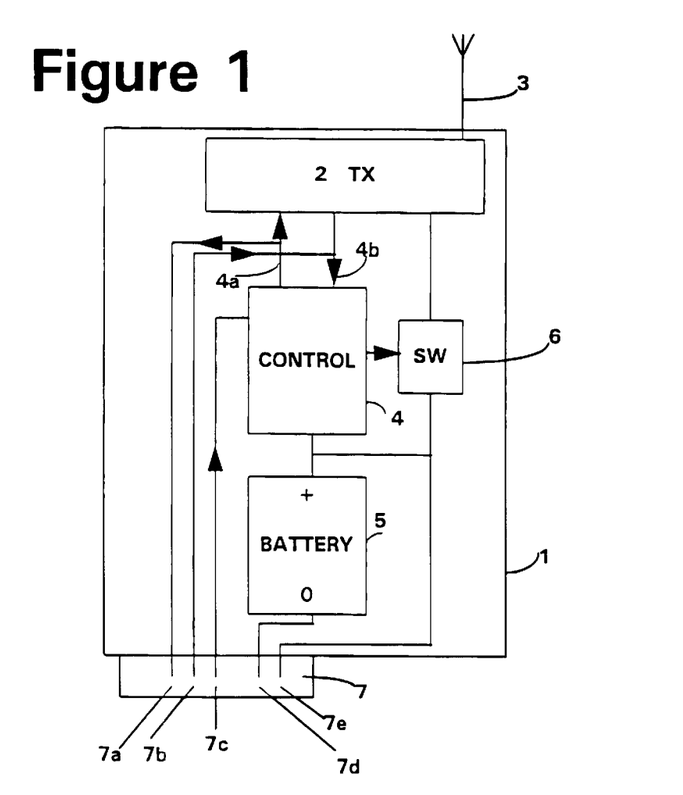
FIG. 1 is a block diagram of a mobile telephone according to the present invention.

Referring to FIG. 1, a GSM (Global System for Mobile communication) cellular telephone 1 comprises r.f. transceiver circuitry 2 coupled to an antenna 3, baseband signal processing and control circuitry 4, a rechargeable battery pack 5, a switch 6 and a socket 7. The processing and control circuitry 4 has a data output terminal coupled to both the r.f. transceiver circuitry 2 and a first contact 7a of the socket 7. A data input terminal 4b of the processing and control circuitry 4 is coupled to the r.f. circuitry 2 and a second contact 7b of the socket 7. A third contact 7c of the socket 7 is coupled to a control input of the processing and control circuitry 4. The battery pack 5 is connected to fourth and fifth contacts 7d, 7e of the socket 7, which are respectively for 0V and +V power supply lines, for powering the telephone 1 and recharging its batteries. The +V terminal of the battery pack 5 is also connected to the processing and control circuitry 4 and to an input terminal of the switch 6. The output terminal of the switch 6 is coupled to a +V input terminal of the r.f. circuitry 2. A control terminal of the switch 6 is coupled to an output of the processing and control circuitry 5.

Figure 2:
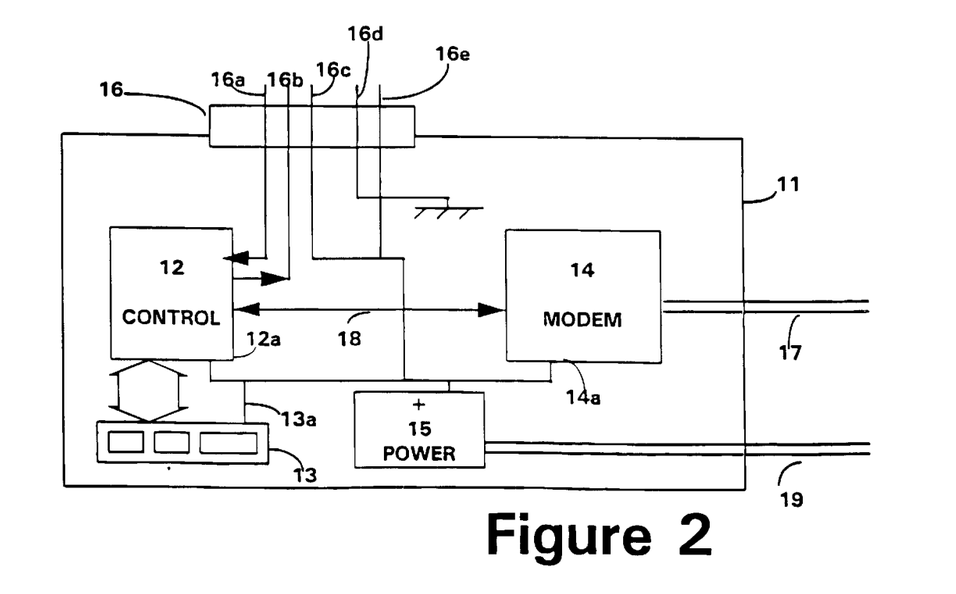
FIG. 2 is a block diagram of an interface unit complementary to the mobile telephone of FIG. 1, according to the present invention.

Referring to FIG. 2, an interface unit 11 comprises a control circuit 12, a user input unit 13, including a keypad and a display, a V.24 9.6 kbit/s modem 14, a power supply unit 15 and a plug 16. The plug 16 has five contacts 16a–16e which correspond to contacts 7a–7e of the socket 7 of the cellular telephone 1. The first contact 16a of the plug 16 is coupled to a data input terminal of the control circuit 12 and the second contact 16b of the plug 16 is coupled to a data output terminal of the control circuit 12. A bi-directional serial link 18 is provided between the control circuit 12 and the modem 14 for modem control and data signals. The third contact 16c and fifth contact 16e of the plug 16 are coupled to the +V output of the power supply unit 15. The fourth contact 16d of the plug 16 is coupled to the interface unit's 0V supply wiring. The user input unit 13 is coupled to the control circuit 12 for the input of user commands and the output of display control signals from the control unit 12 to the user input unit 13. The +V output of the power supply unit 15 is also coupled to +V input terminals 12a, 13a, 14a of the control circuit 12, the user input unit 13 and the modem 14. The modem 14 is coupled to a telephone line 17 and the power supply unit 15 is arranged to receive power from a mains electricity supply 19.

Figure 3:
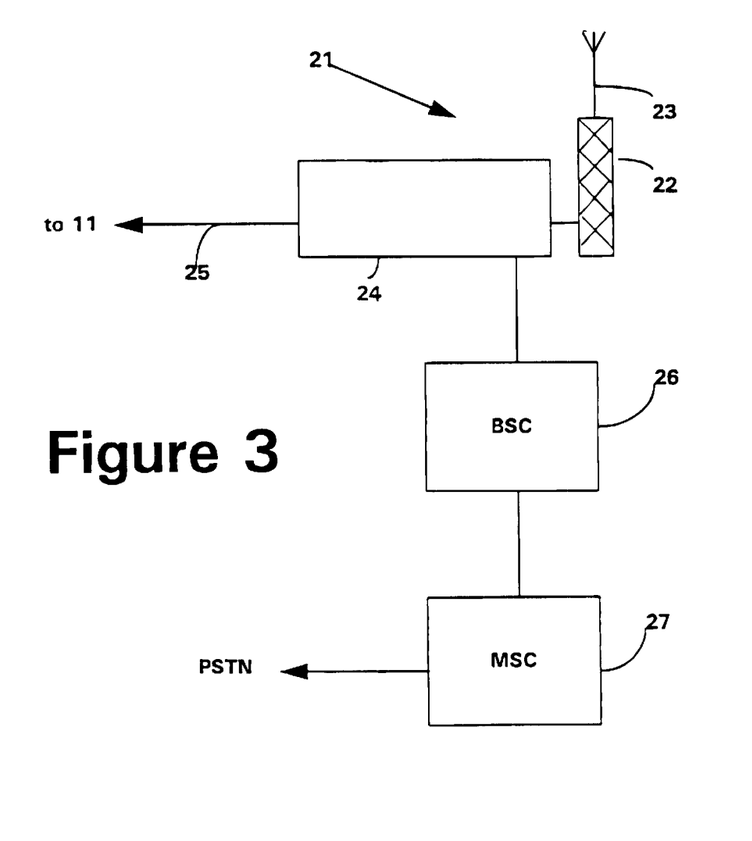
FIG. 3 is a block diagram of the fixed elements of a cellular telephone system according to the present invention.

Referring to FIG. 3, a BTS (base transceiver site) of a GSM cellular telephone system comprises a mast 22, supporting one or more antennas 23, and a call processing apparatus 24. The call processing apparatus 24 is connected to the antenna 23, a telephone line 25 and, in the conventional manner, to a BSC (base station controller) 26. The BSC 26 is linked, also in the conventional manner, to a MSC (mobile switching centre) 27 which connects the GSM cellular telephone system to the PSTN.

Figure 4:
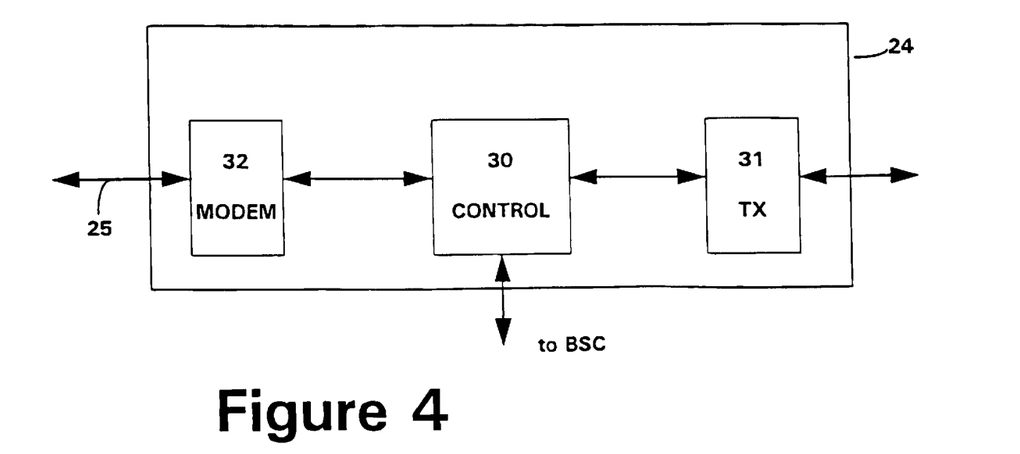
FIG. 4 is a block diagram of a call processing apparatus of a base transceiver site according to the present invention.

Referring to FIG. 4, the call processing apparatus 24 comprises a controller 30, r.f. transceiver circuitry 31 coupled to the antenna or antennas 23, and a V.24 9.6 Kbit/s modem 32. The modem 32 is connected to the telephone line 25. The operation of the call processing apparatus 24 is substantially conventional. There may be a plurality of telephone lines and associated modems. However, only one of each is shown in the interests of clarity.

Figure 5:
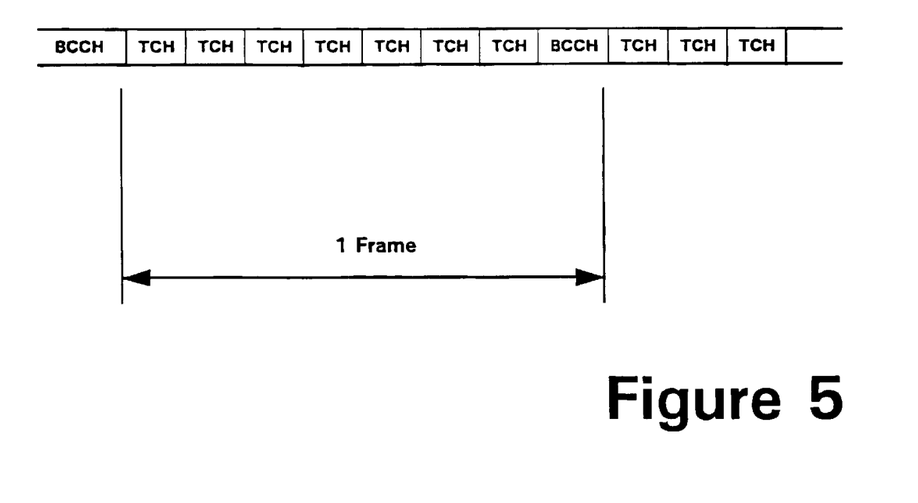
FIG. 5 illustrates the frame structure of the output from the interface unit of FIG. 2.

Referring to FIG. 5, communication between the interface unit 11 and the BTS 21 uses a TDM (time-division multiplex) scheme wherein one in eight slots is used for the BCCH (broadcast control channel) and the other slots are used for a TCH (traffic channel).

The departures from the conventional operation of a GSM BTS will become apparent from the following description of the operation of the system shown in FIGS. 1 to 5. As shown in FIG. 1, the interface unit 11 is located at a subscriber's home or office. In order to make the interface unit 11 ready for use, it must be programmed with its own telephone number and the telephone number of the BTS 21. Typically, the BTS 21 will be nearby, in order to minimise telephone charges. However, if the local BTSs are all heavily used, for example in a city centre, the telephone number of a more lightly used BTS, for instance one in a rural area, could be programmed into the interface unit 11. The entry of the telephone number is effected using the user input unit 13. Programming of apparatus for automatic dialling of telephone numbers is well-known in the art. Different BTSs, and therefore different telephone numbers, could be used according to the time of day, to make use of spare capacity available at different times at different BTSs.

While the subscriber is on the move, his mobile telephone 1 interacts with the GSM network in the usual manner. However, when he arrives at a location having an interface unit 11, he connects the plug 16 of the interface unit 11 to the socket 7 on his telephone 1 by a cable (not shown). Assuming that the interface unit 11 is powered up, the voltage on the third contact 7c of the socket 7 is detected by the processing and control circuitry 4 which thereby determines that the telephone 1 has been connected to the interface unit 11. The connection of the battery 5 to the power supply 15 by way of the connections 7d/16d and 7e/16e also allows the battery to be recharged.

Once the processing and control circuitry 4 has determined that the telephone 1 has been connected to the interface unit 11, it sends a control signal to the switch 6, causing it to open, isolating the r.f. circuitry 2 from the battery pack 5 and the power supply 15 in the interface unit 11. The processing and control circuitry 4 also responds to the voltage on the third contact 7c of the socket 7 by selecting alternative control programs or constant data to allow for delays in the signal path from the telephone 1 to the controller 30 which are caused by the use of the PSTN and the modems 14, 32.

If the telephone 1 is switched off when it is connected to the interface unit 11, it must register with the cellular telephone network. To do this, the processing and control circuitry 4 produces the conventional GSM registration signal. The registration signal is not transmitted from the antenna 3 because the r.f. circuitry 2 is disabled. Instead, it is output to the interface unit 11 via the first contacts 7a, 16a of the socket 7 and plug 16.

The control circuit 12 detects the registration signal and identifies it as such. In response to the registration signal, the control circuit 12 instructs the modem 14 to dial the telephone number of the BTS 21.

The controller 30 is notified by the modem 32 of the ring signal on the telephone line 25 and sends an "answer" command to the modem 32. Before proceeding further, the BTS 21 carries out a call screening process to check that the calling party is in fact an interface unit. This may be done conveniently by a "handshake" procedure involving the interface unit 11 transmitting either its own telephone number or some other identifying code to the BTS 21. The interface unit 11 then relays the registration signal to the BTS 21 using the BCCH slots. The controller 30 responds to the registration signal in the conventional manner and the telephone 1 is then registered with the cellular telephone network. After registration signalling has been completed, the interface unit modem 14 sends the interface unit's telephone number to the BTS 21 where it is stored by the controller 30 together with the telephone's 1 network ID. After the interface unit's telephone number has been received, the controller 30 sends an "on hook" command to the modem 32. The control circuit 12 receives a "no carrier" signal from the modem 14 and returns an "on hook" command.

If the telephone 1 is switched on when is connected to the interface unit 11, it does not need to register. However, it must perform a location update. The location update is carried out in a similar manner to registration. Similarly, if the telephone 1 is disconnected from the interface unit 11 while it is switched on, it must perform a location update as soon as its r.f. circuitry 2 becomes active again. Location updating is a conventional aspect of GSM systems.

A call from the telephone 1 will now be described.

When the subscriber wishes to make a call, he enters the called party's telephone number into the telephone 1 in the normal manner and then presses the SEND key. If the telephone is connected to the interface unit 11, the control circuit 12 detects the call set-up signals from the telephone 1 (received over the connection 7a, 16a) and causes the modem 14 to dial up the BTS 21. The BTS's controller 30 answers the call, as described above. Once the connection between the interface unit 11 and the BTS 21 has been established, the control circuit 12 relays the call set up signals to the BTS 21.

When the controller 30 receives the call set up signals from the interface unit 11, it gets a channel allocation for the call from the BSC 26. The BSC 26 will note that the telephone 1 has a dedicated channel and will therefore allocate the dedicated channel rather than proceed with the conventional radio channel allocation process. The request for a call to be set up is passed to the MSC 27 via the BSC 26. The MSC 27 then operates to establish a connection between the called party and the BTS 21, by way of the PSTN.

The controller 30 communicates the allocated channel to the interface unit 11. Although this is predetermined, it serves to indicate that the call has been set up. Using a dummy allocated signal is convenient because it mimics the operation of the system when the telephone 1 is mobile. Once the call has been set up, the control circuit 12 relays speech and control data from the telephone 1 to the BTS 21 and vice versa.

When the call is complete, the controller 30 and the control circuit 12 break the connection between the interface unit 11 and the BTS 21.

A call to the telephone 1 will now be described.

When the telephone 1 is called, the MSC identifies the called number as relating to a telephone currently registered with the BTS 21, and routes the call to the BTS 21 via the BSC 26. The BSC 26 first checks the ID of the telephone 1 against its list of mobile units with dedicated channels. The BSC 26 finds the telephone's ID in the list and modifies its operation accordingly. Having found the telephone's ID on the list, the BSC 26 instructs the controller 30 to retrieve the interface unit's telephone number and causes the modem 32 to dial it.

The interface unit 11 causes the modem 14 to answer the call and once the connection has been established, the controller 30 sends a call signal to the interface unit 11. The interface unit 11 recognises the call signal and relays it to the telephone 1 via the second pins 16*b*, 7*b* of the plug 16 and socket 7. The telephone 1 then responds as if it were receiving the signal from the antenna 3 and starts to ring.

The subscriber hears the telephone 1 ringing and presses the answer button on the telephone 1. The telephone 1 and the controller 30 then exchange signals via the interface unit 11 using the BCCH slots to set up the call. The channel allocation is of course predetermined. Once the connection is established between the calling party and the telephone 1, the controller 12 relays speech signals between the telephone 1 and the BTS 21, and vice versa, until the call is terminated.

Figure 6:
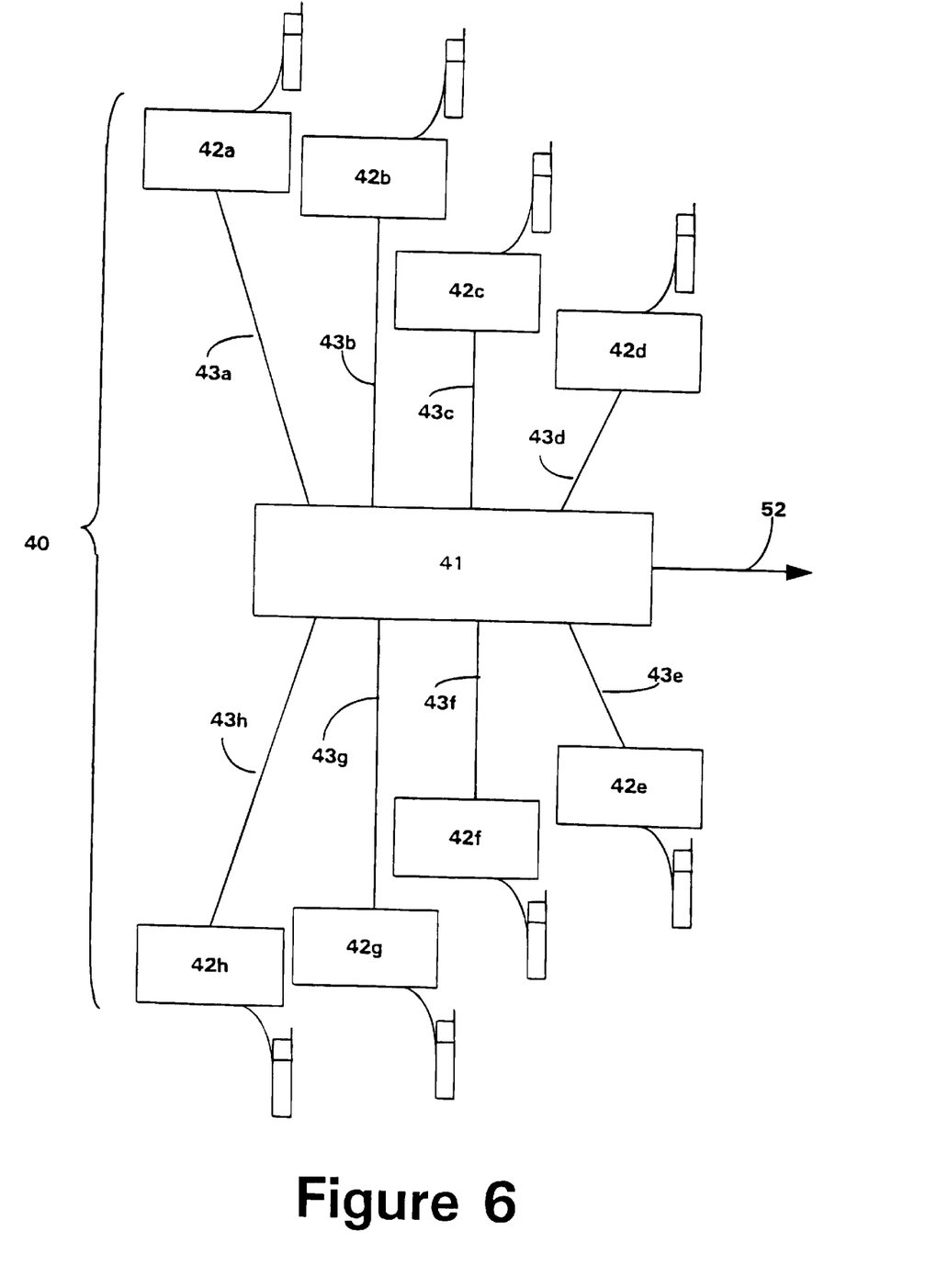
FIG. 6 is a block diagram of another embodiment of a subscriber installation according to the present invention.

It will be appreciated that the PSTN link 25 between the interface unit and the BTS 21 may be replaced by an ISDN link (52, FIG. 6). ISDN links provide much greater bandwidth than PSTN links. Consequently, a single ISDN link can be used to connect a plurality of mobile telephones to a BTS. Such a system will now be described, with reference to FIGS. 1, 3, 6, 7 and 8. For a proper understanding of the following embodiment, the channel codec of the telephone 1 should be viewed as forming part of the r.f. circuitry 2 (FIG. 1).

Referring to FIG. 6, an interface system 40 comprises a central part 41 and eight remote parts 42*a*–42*h*. The remote parts 42*a*–42*h* are each connected to the central part 41 by respective transmission lines 43*a*–43*h*.

Figure 7:
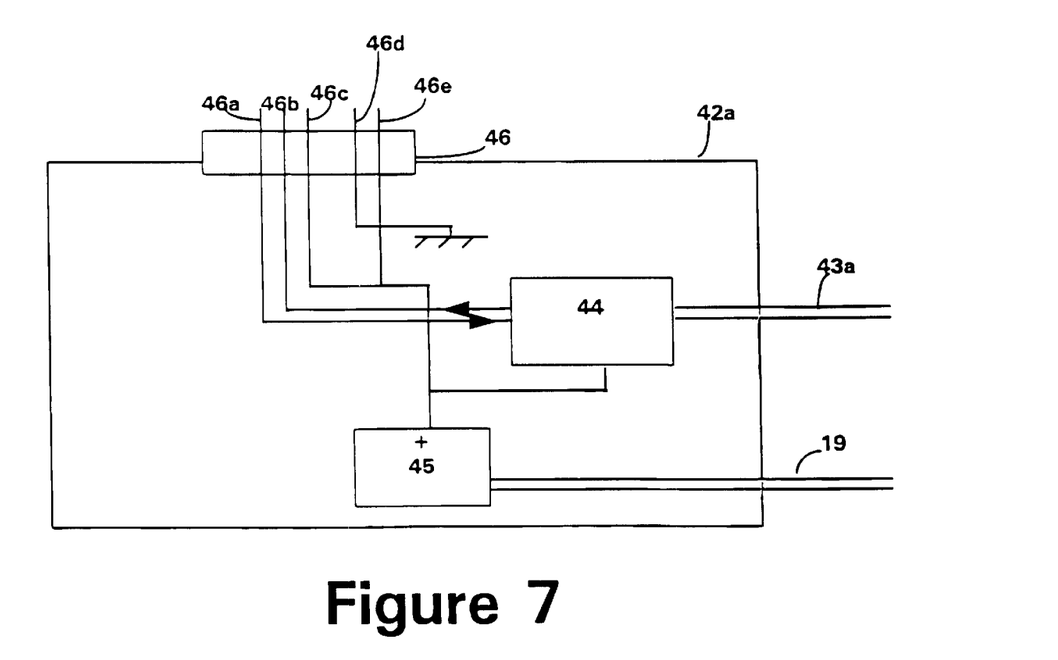
FIG. 7 is a block diagram of one of the remote parts of the interface system of FIG. 6.

Referring to FIG. 7, a remote part 42*a* comprises a baseband data transceiver 44, a power supply unit 45 connected to a mains electricity supply 19, and a plug 46. The plug 46 has five contacts 46*a*–*e* which correspond to contacts 7*a*–7*e* of the socket 7 of the cellular telephone 1 (FIG. 1) and have similar functions to the contacts 16*a*–16*e* in the socket of the interface unit 16 previously described with reference to FIG. 2. The first contact 46*a* of the plug 46 is coupled to a data input terminal of the transceiver 44 and the second contact of the plug 46 is coupled to a data output terminal of the transceiver 44. The third contact 46*c* and fifth contact 46*e* of the plug 46 are coupled to the +V output of the power supply unit 45. The fourth contact 46*d* of the plug 46 is coupled to the remote part's 0V supply wiring. The +V output of power supply unit 45 is also coupled to +V input terminal of the transceiver 44. The transceiver 44 is also coupled to the transmission line 43*a* between the remote part 42*a* and the central part 41. Remote parts 42*b*–42*h* have the same construction as remote part 42*a*.

Figure 8:
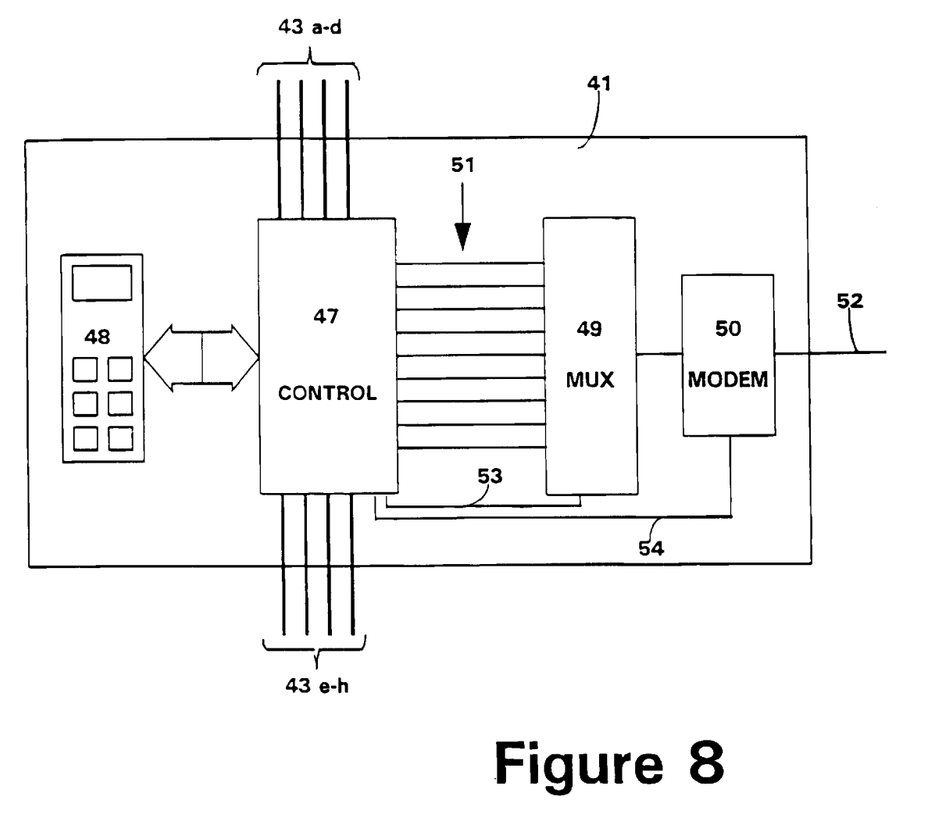
FIG. 8 is a block diagram of a central part of the interface system of FIG. 6.

Referring to FIG. 8, the central part 41 comprises a control circuit 47, a user input unit 48, a 9-to-1 multiplexer 49 and a modem 50. The user input unit 48 is coupled to the control circuit 47 and enables a user to program the interface system with the ISDN number of a BTS 21. The user input unit 48 includes a display on which is displayed status information for the interface system.

The control circuit 47 is coupled to each of the transmission lines 43*a*–43*h* for communicating with telephones at the remote parts 42*a*–42*h*. Nine parallel data lines 51 connect the control unit 47 to the multiplexer 49. The multiplexer 49 has its common terminal connected to the modem 50 which provides a link to an ISDN line 52, providing connection to the BTS 21, in place of the PSTN link 25 shown in FIG. 3. Control lines 53, 54 link the control circuit 47 to the multiplexer 49 and the modem 50.

An ISDN2 link (i.e. having two 64 kbit/s "B" (bearer) channels and one 16 kbit/s "D" (signalling) channel) is described here, and has adequate capacity to support eight remote parts 42*a*–42*h*. An ISDN30 link (thirty B channels, one D channel and a synchronisation channel, all of 64 kbit/s) could be used if greater capacity were required.

Of the nine data lines 51 between the control circuit 47 and the multiplexer 49, eight correspond to respective remote parts 42*a*–42*h* and the ninth is used for BCCH signals. The two B channels of the ISDN2 link to the BTS can carry a total of eight TCHs, the BCCH signals being carried in the D channel. The various channels are time-division multiplexed in the ISDN2 link.

In the embodiment depicted in FIG. 8, the signal paths and multiplexer 49 of the central part 41 are bi-directional. However, it will be appreciated that separate paths and multiplexers may be used for signals from and to a BTS.

The operation of this embodiment will now be described with reference to FIGS. 1, 3, 6, 7 and 8.

When the telephone 1 is first connected to, for example, remote part 42*a* of the interface system 40, it must register with the cellular telephone network or perform a location update. To do this, the processing and control circuitry 4 produces the conventional GSM registration or location update signal. The signal is not transmitted from the antenna 3 because the r.f. circuitry is disabled. However, it is output to the remote part 42*a* via the first contact 7*a* of the socket 7.

The signal is then relayed by the data transceiver 44 along the transmission line 43*a* to the central part 41 of the interface system. The control circuit 47 detects the signal and identifies it as a registration or location update signal as the case may be. In response to the signal, the control circuit 47 first determines whether the interface system is already connected to the BTS 21. If a connection already exists, the control circuit 47 passes the signal through to the multiplexer 49. When the multiplexer 49 selects the appropriate input line 51, the signal is supplied to the modem which transmits it to the BTS 21 via the ISDN2 link 52.

However, if the control circuit 47 determines that an ISDN connection needs to be established, it instructs the modem 50 to dial the ISDN number of the BTS 21. At the BTS 21, the controller 30 is notified by the modem 32 of the call on the ISDN line 25 and sends an "answer" command to the modem 32. The central part 41 of the interface system then relays the registration or location update signal to the BTS 21 using the ISDN2 D channel. The controller 30 responds to the registration or location update signal in the conventional manner and the telephone is then registered, if necessary, with the cellular telephone network. After registration or location update signalling has been completed, the control circuit 47 sends the interface system's ISDN number and the channel for the remote part 42a to the BTS 21 where they are stored by the controller 30 together with the telephone's 1 network ID. An indication of the interface system 40, the channel for the remote part 42a and the telephone's 1 network ID are passed on to the BSC 26. The connection 52 between the interface system 40 and the BTS 21 will then be broken if it is no longer required.

Since the telephone 1 is not operating in the conventional manner and, in effect, has a dedicated channel allocated to it, the BSC 26 must recognise when the telephone 1 is being called and depart from the conventional channel allocation process.

A call from a telephone 1 at, for example, remote part 42a will now be described.

When the subscriber wishes to make a call, he enters the called party's telephone number into the telephone 1 in the normal manner and then presses the SEND key. If the telephone 1 is connected to one of the remote parts e.g. 42a, the call set-up signals are sent by way of the connections 7a, 46a and the remote part 42a to the central part 41 where they are detected by the control circuit 47. If the interface system is already connected to the BTS 21, the call set-up signals are immediately applied to the multiplexer 49 ready for transmission in the appropriate TDM slot.

However, if a connection needs to be established, the control circuit 47 causes the modem 50 to dial up the BTS 21. The BTS's controller 30 answers the call, as described above. Once the connection between the interface system and the BTS 21 has been established, the control circuit 47 relays the call set up signals to the BTS 21 using the D channel.

When the controller 30 receives the call set up signals from the interface system, the BSC 26 allocates a channel for the call. However, the BSC 26 will note that the telephone 1 has a dedicated channel and will therefore allocate the dedicated channel rather than proceed with the conventional radio channel allocation process. The request for a call to be set up to is passed on to the MSC 27 from the BSC 26. The MSC 27 then operates to establish a connection between the called party and the BTS 21, by way of the PSTN.

The controller 30 communicates the allocated channel to the interface system. Although this is predetermined, it serves to indicate that the call has been set up. Using a dummy allocated signal is convenient because it mimics the operation of the system when the telephone 1 is mobile. Once the call has been set up, the control circuit 47 relays speech and control data from the telephone 1 to the BTS 21 and vice versa, using the allocated TCH for speech data and the D channel for control signals.

After the call is complete and either party has hung up, the controller 30 and the control circuit 47 release the ISDN channel between the interface system 40 and the BTS 21. If the channel was the only one in use, the ISDN connection between the interface system 40 and BTS 21 can also be released. There may be a delay before such release occurs, to allow for the possibility that the user intends to make a further call as soon as the first clears down.

A call to the telephone 1 will now be described.

When the telephone 1 is called, the MSC identifies the called number as relating to a telephone currently registered with the BTS 21, and routes the call to the BTS 21 via the BSC 26. The BSC 26 first checks the ID of the telephone 1 against its list of mobile units with dedicated channels. The BSC 26 finds the telephone's ID in the list and modifies its operation accordingly. Having found the telephone's ID on the list, the BSC 26 instructs the controller 30 to retrieve the ISDN number of the interface system 40. If the ISDN link is not already open, it next causes the modem 32 to dial it, and the interface system 40 then causes the modem 14 to answer the call. Once the ISDN link is open, or if it is already open, the controller 30 is informed of the ISDN link channel allocated to the telephone 1 by the BSC 26. This indicates which TDM slot must be used for the called telephone.

Preferably, such a telephone includes r.f. circuitry for transmitting and receiving speech and data signals, a further externally accessible connector and switching means, wherein the switching means is responsive to a signal applied to the further connector to disable the r.f. circuitry.

Once the connection has been established, the controller 30 sends a dummy channel allocation signal to the interface system. The interface unit 11 recognises the dummy channel allocation signal and relays it to the telephone 1 via the transmission line 43a. The telephone 1 then responds as if it were receiving the signal from the antenna 3 and starts to ring.

The subscriber hears the telephone 1 ringing and presses the answer button on the telephone 1. The telephone 1 and the controller 30 then exchange signals via the interface system to set up the call. Once the connection is established between the calling party and the telephone 1, the controller 47 relays speech signals between the telephone 1 and the BTS 21, and vice versa, in the allocated TCH until the call is terminated.

It will be appreciated that the dial-up connections, described above, could be replaced by leased lines from another operator or dedicated lines owned by the cellular network operator, providing a permanent connection between the interface unit or system and a BTS.

Instead of the electrical/mechanical plug-and-socket connections 7/16 and 7/46 illustrated in FIGS. 1, 2, and 7, the connection between the mobile telephone and the interface unit may be by means of an ultrasonic or optical (e.g. infra-red) link, as will now be described with reference to FIGS. 9 and 10, in which components having equivalent features to those in FIGS. 1 and 2 are given the same reference numerals.

Figure 9:
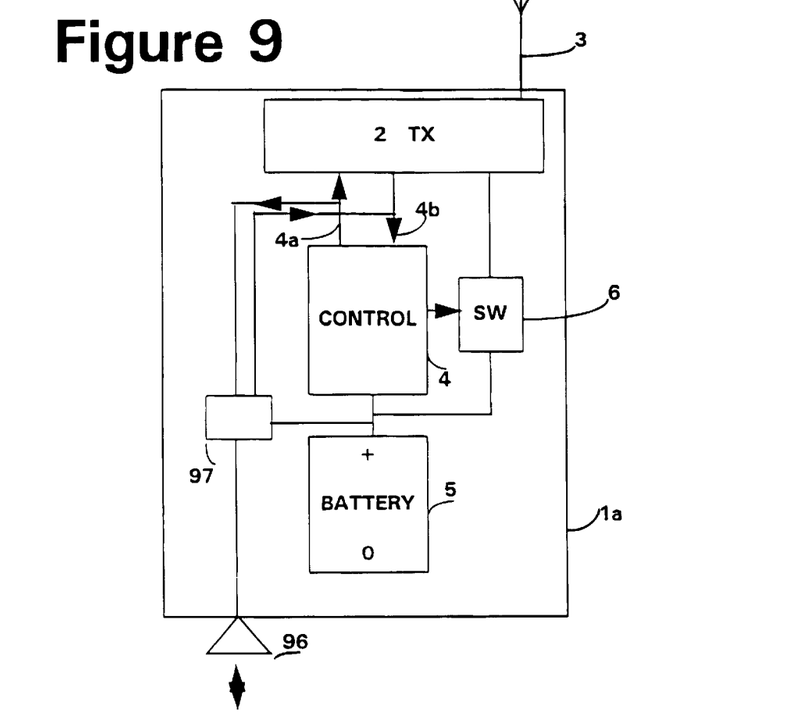
FIG. 9 is a block diagram of another cellular telephone according to the present invention.

Referring to FIG. 9, the cellular telephone 1a is similar to that already described with reference to FIG. 1, except that the socket 7 is replaced by an ultrasound or optical antenna (sensor/transmitter) 96, connected by means of a suitable transceiver 97 to the process and control circuitry 4 and R.f. circuitry 2.

Figure 10:
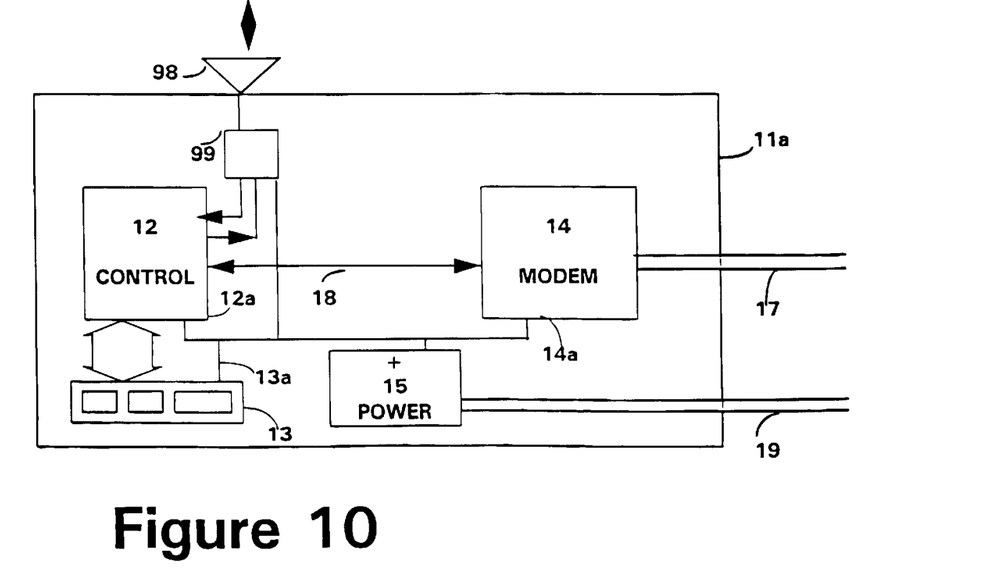
FIG. 10 is a block diagram of an interface unit complementary to the cellular telephone of FIG. 9, according to the present invention.

Referring to FIG. 10, the interface unit 11a is similar to that described with reference to FIG. 2, except that the plug 16 is replaced by an ultrasound or optical antenna (sensor/transmitter) 98, complementary to the antenna 96 in the telephone 1a, and connected by means of a suitable transceiver 99 to the control circuit 12.

The transceivers 97, 99 convert baseband signals (either conventional analogue signals, or digitised signals such as would normally be transmitted from/received by the antenna 3) received from the control units 4, 12 respectively into signals suitable for transmission by the antennas 96, 98 respectively. These signals may simply be a modulation of the optical or ultrasonic carrier, or they may be converted by the transceivers 97,99 to a digital format such as the IrDA protocol previously referred to. These signals are then transmitted by the antennas 96, 98. Signals received by the antennas 96,98 are reconverted to baseband analogue or digital signals, by the respective transceivers 97,99, for further processing and onward transmission by the control units 4, 12 respectively.

The operation of this system is largely similar to that of FIGS. 1 and 2. However, as there is no electrical connection between the mobile telephone 1a and the interface unit 11a, there can be no external power supply to the telephone 1a, and therefore no equivalent to the electrical power connections 7c/16c; 7d/16d; 7e/16e. This has two further consequences. Firstly, the battery 5 cannot be recharged by means of the interface unit 11a (separate battery charging arrangements being necessary). As shown in FIG. 9 the battery is delivering power to the various components 4, 97 etc. Moreover, detection of the presence of a connection cannot be done by detecting the presence of a voltage as is done in the embodiment of FIG. 1 (connection 7c). Instead, the control apparatus 4 is arranged to respond to the presence of a signal on the input 4b, (received by the antenna 96) to control the switch 6. Alternatively, the switch may be controlled manually.

The arrangement of FIG. 7 may be adapted for use by an optical or ultrasonic connection in a similar manner to the adaptations to FIG. 2 illustrated in FIG. 10.

In the foregoing embodiments, a "land line" is used to connect the interface unit or system to the BTS. A further embodiment will now be described, with reference to FIGS. 11, 12, 13, 14, and 15 which uses a wireless link between an interface system and a BTS.

Figure 11:
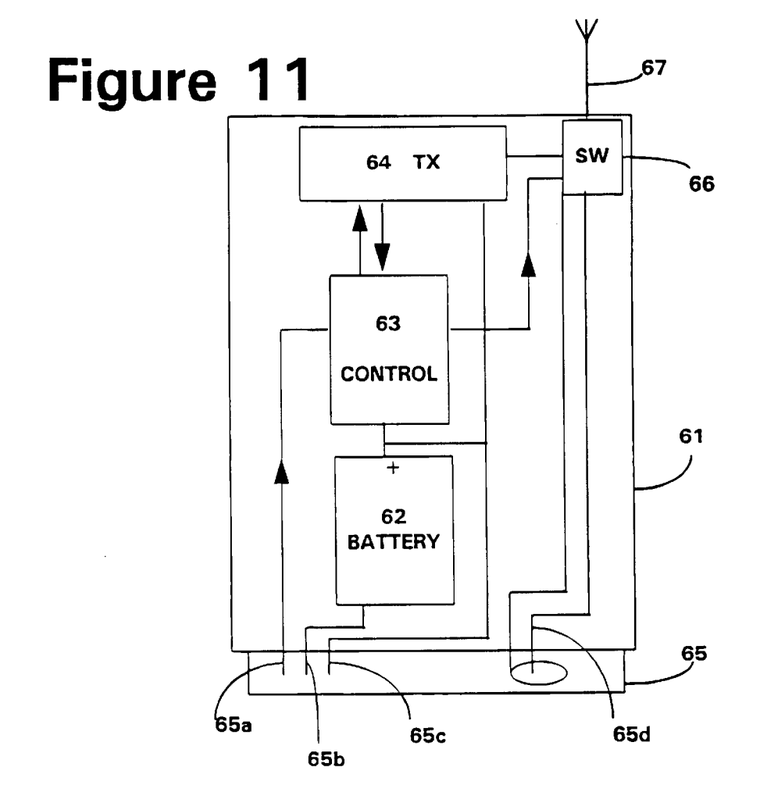
FIG. 11 is a block diagram of another cellular telephone according to the present invention.

Referring to FIG. 11, a cellular telephone 61, generally conventional in construction, comprises a battery pack 62, signal processing and control circuitry 63 and r.f. circuitry 64. However, the telephone 61 further comprises a connector 65 having three simple contacts 65a, 65b, 65c, a coaxial socket 65d, and an r.f. switching circuit 66. The first contact 65a of the connector 65 is coupled to a control input of the processing and control circuitry 63. The second and third contacts 65b, 65c are connected respectively to the negative and positive terminals of the battery pack 62. The r.f. switching circuit 66 is arranged to connect the r.f. circuitry 64 to either an antenna 67 or the coaxial socket 65d in dependence on a control signal from the processing and control circuitry 63. The first contact 65a of the connector 65 is connected to a control input of the processing and control circuitry 62. When the processing and control circuitry 63 detects a voltage on the first contact 65a of the connector 65, it sends a control signal to the r.f. switching circuit 66 to connect the r.f. circuitry 64 to the coaxial socket 65d rather than the antenna 67. The connections 65b/73b and 65c/73c allow the battery 5 to be recharged from the power supply unit 72.

Figure 12:
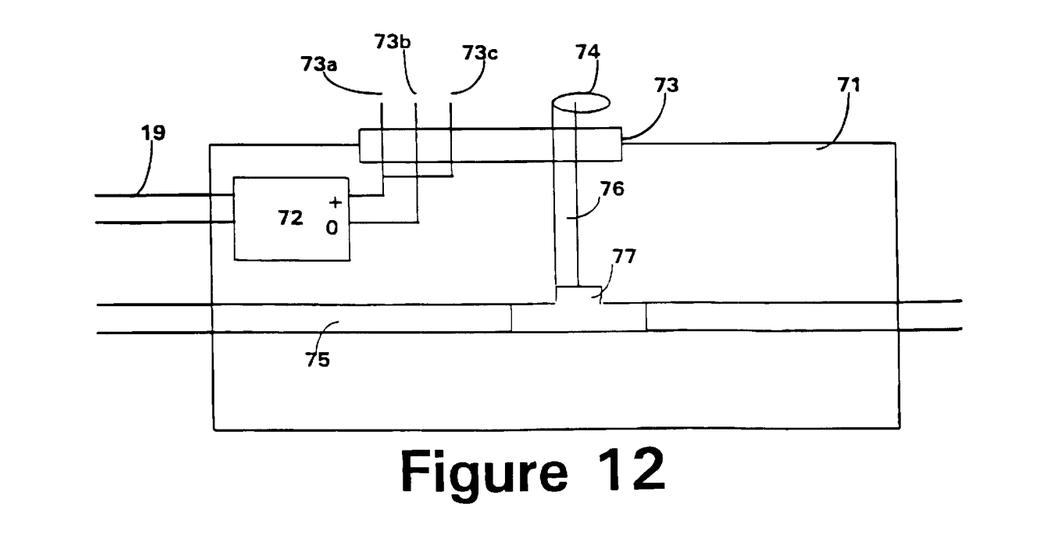
FIG. 12 is a block diagram of a remote part of an interface system for use with the telephone of FIG. 11.

Referring to FIG. 12, a remote part 71 of an interface system comprises a mains power supply unit 72 connected to a mains electricity supply 19, and a connector 73 adapted to cooperate with the connector 65 of the telephone 61. The first and third contacts 73a, 73c of the connector 73 are connected to the +V output of the power supply unit 72 and the second contact 73b of the connector 73 is connected to the OV output of the power supply unit 72. The connector 73 includes a coaxial plug 74. A transmission line 75 extends through the remote part 71 and is coupled to the coaxial plug 74 by a tap 76 and a branch 77 of the transmission line 75.

Figure 13:
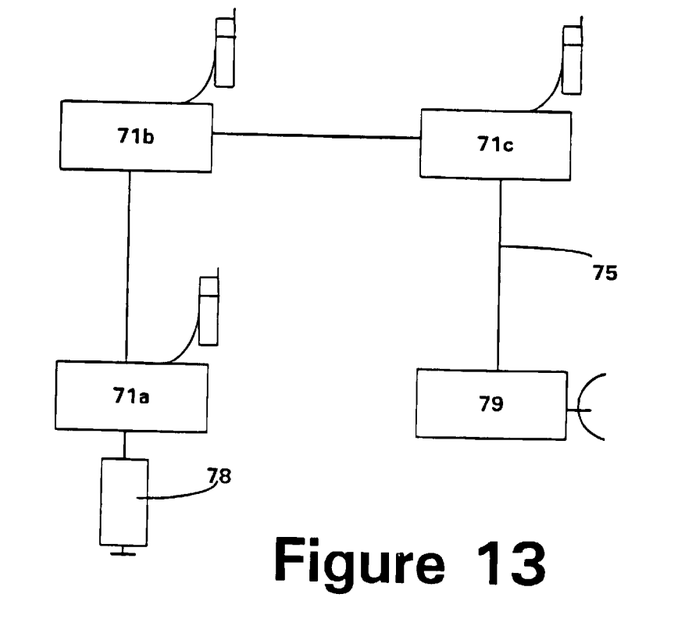
FIG. 13 is a block diagram of a subscriber installation for use with the telephone of FIG. 11 and interface system of FIGS. 12 and 14.

Referring to FIG. 13, a plurality of interface system remote parts 71a–71c are spaced along a transmission line 75, such as a coaxial cable. A central part 79 of the interface system is connected to one end of the transmission line 75. A terminating impedance 78 is connected to the other end of the transmission line 75.

Figure 14:
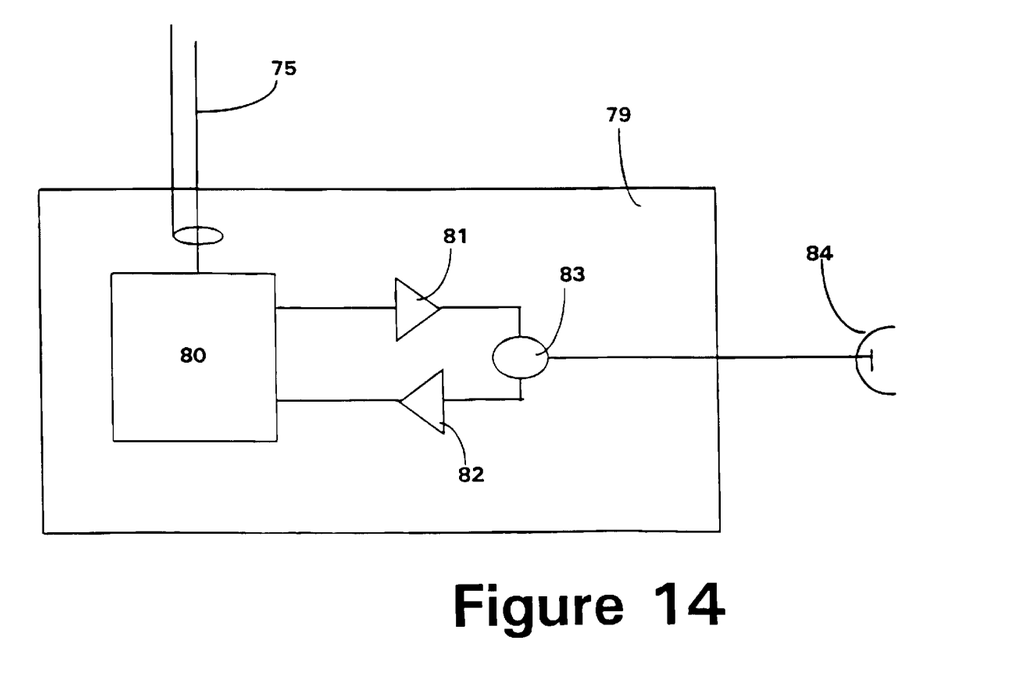
FIG. 14 is a block diagram of the central part of the interface system of the subscriber installation of FIG. 13.

Referring to FIG. 14, the central part 79 of the interface system comprises a frequency transposer 80 for transposing signals from the transmission line 75 to a microwave band and transposing microwave signals to the band for which the telephone 61 is adapted, a microwave power amplifier 81 for amplifying microwave signals from the transposer 80, a microwave pre-amplifier 82 for amplifying received microwave signals before they are applied to the transposer 80 and a duplexer 83 coupled to the output of the power amplifier 81, the input of the pre-amplifier 82 and a waveguide to a dish antenna 84.

Figure 15:
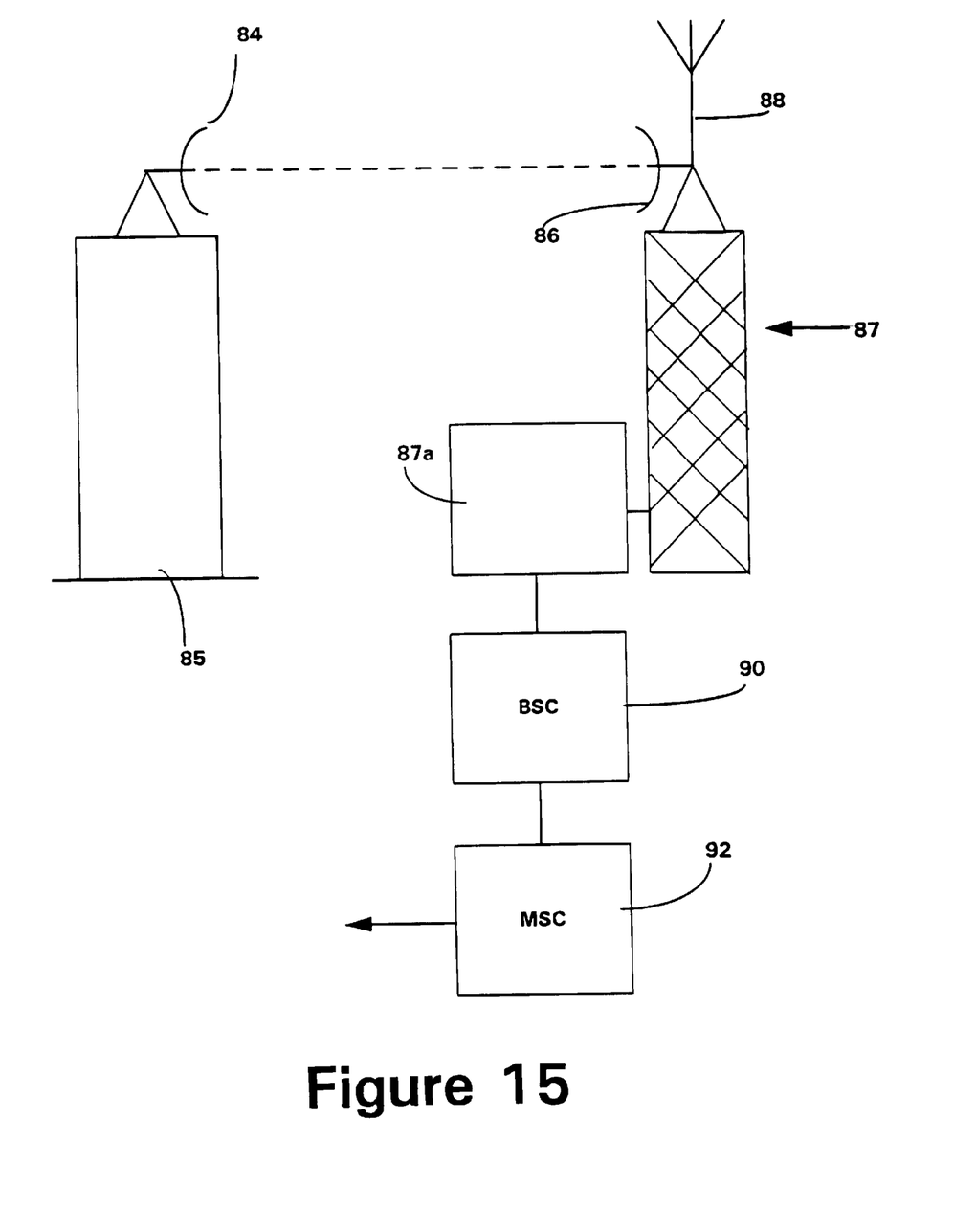
FIG. 15 is a block diagram of a cellular telephone system which uses the telephone of FIG. 11.

Referring to FIG. 15, the dish antenna 84 is mounted on a building 85, for example an office block, and is aligned with another dish antenna 86 at a BTS 87. The transmission line 75 extends substantially throughout the building 85. The BTS 87 includes a UHF antenna 88 for conventional GSM communication and a call processing apparatus 87a. The call processing apparatus 87a is linked to a BSC 90 which is in turn linked to a MSC 92, providing connection to the PSTN.

Since the interface system merely transposes the band in which the telephone 61 operates, the BTS 87 can be in fact two BTSs, one operating in a conventional UHF GSM band using the UHF antenna 88, and the other operating in a microwave band, using the dish antenna 86.

In the foregoing embodiments, an interface unit or system provides communication to a conventional BTS site which has antennas for communicating with mobile equipment in its cell. However, the "BTS", with which the interface unit or system communicates, may be arranged solely for communication with interface units or systems according to the present invention. Thus, in the case of a large office complex for example, it may be desirable to have the "BTS" at the complex and avoid the need for the telephone, ISDN, leased line or microwave link.

Adapters are known for allowing handheld mobile telephones to be used in a vehicle-mounted installation. These systems often provide a microphone and a loudspeaker to allow hands-free operation of the telephone. It will be appreciated that such an arrangement could be employed with the present invention. Alternatively, the interface unit or remote part of the interface system could be provided with a handset to replace the microphone and loudspeaker of the mobile telephone when it is docked with the interface unit or remote part of an interface system according to the present invention. If the user does not need to use the microphone and the loudspeaker of the mobile telephone itself, it can be plugged directly into an interface unit or a remote part of an interface system without the need for a connecting cable.

GSM terminology has been used in the foregoing description. However, the present invention is not limited to the GSM system and is applicable also to other systems, including DAMPS (digital advanced mobile phone system), DCS1800 (digital communications system 1800 MHz), PCS1900 (personal communication system 1900 MHz), Japanese PDC (personal digital cellular), US IS-96 CDMA, UMTS (universal mobile telephone system) and FPLMTS (future public land mobile telephone system). Additionally, the present invention can be applied to DECT (digital European cordless telephone) CT2 and Japanese Personal Handyphone systems interacting with fixed intelligent systems. The present invention is further applicable to analogue cellular telephone systems.

What is claimed is:

1. A cellular telephone system comprising:

a system of cells, each cell comprising a radio base station, and a cellular telephone call switching system for routing calls to radio base stations, and, thus, to mobile telephones in radio communication with the radio base stations, wherein an additional communication path between the mobile telephone and the switching system is provided, the additional communication path including interface means to provide a switched connection between the mobile telephone and the cellular telephone call switching system so as to by-pass the radio frequency circuitry and antenna of the mobile telephone, the additional communication path having a dedicated channel in the switching system, not associated with a radio frequency channel, for connection of calls to and from a mobile telephone, wherein the interface means comprises a modem that provides a communications connection to the mobile telephone for baseband speech and control data signals, and wherein the communications path comprises a switched network.

2. A cellular telephone system comprising:

a system of cells, each cell comprising a radio base station, and a cellular telephone call switching system for routing calls to radio base stations, and, thus, to mobile telephones in radio communication with the radio base stations, wherein an additional communication path between the mobile telephone and the switching system is provided, the additional communication path including interface means to provide a switched connection between the mobile telephone and the cellular telephone call switching system so as to bypass the radio frequency circuitry and antenna of the mobile telephone, the additional communication path having a dedicated channel in the switching system, not associated with a radio frequency channel, for connection of calls to and from a mobile telephone, wherein the interface means comprises a modem that provides a communications connection to the mobile telephone for baseband speech and control data signals, and wherein the communications path comprises a fixed point-to-point signal path.

3. A cellular telephone system comprising:

an additional communication path independent of a system of cells of the cellular telephone system, between a mobile telephone and a cellular telephone call-switching system, the additional communication path being other than RF, and including an interface means for providing a communications connection between a mobile telephone and the cellular telephone call switching system so as to by-pass the telephone's radio antenna, and wherein the interface means comprises a modem and provides a connection to the mobile telephone for baseband speech and control data signals, the communications path comprises a switched network, and the interface means is arranged for providing communications connections for a plurality of mobile telephones to the call switching system and the bandwith of the communications path is sufficient for a plurality of simultaneous calls.

4. A cellular telephone system comprising:

an additional communication path independent of a system of cells of the cellular telephone system, between a mobile telephone and a cellular telephone call-switching system, the additional communication path being other than RF, and including an interface means for providing a communications connection between a mobile telephone and the cellular telephone call switching system via a radio base station so as to by-pass the telephone's radio antenna, wherein the interface means includes a modem that provides a communications connection with the radio frequency circuitry of a mobile telephone for radio frequency speech and data signals and provides a connection to the transmission line from the radio frequency circuitry of a plurality of mobile telephones, and wherein the interface means is programmed to contact the radio base station when one of the mobile telephones is connected to the interface means, such that all calls to and from the mobile telephone are routed via the additional communication path.

5. An interface apparatus for providing a communications connection between a mobile telephone and a cellular telephone call-switching system so as to by-pass the telephone's radio antenna, the apparatus comprising:

a first connect for exchanging speech and data signals with a cellular mobile telephone, a second connector for connecting the apparatus to a transmission line for communicating with the cellular telephone call switching system, a modem for exchanging said speech and data signals via the second connector, one or more further connectors for exchanging speech and data signals with further cellular mobile telephones, and a multiplexer for multiplexing signals from the first and further connectors, wherein the modem is arranged for transmitting the output of the multiplexer to the transmission line, and the first connector is arranged to exchange baseband signals with the mobile telephone.

6. An interface apparatus as in claim 5, wherein the first connector is arranged for exchanging speech and data signals via an optical or ultrasonic carrier.

7. An interface apparatus as in claim 5, including:

control means and dialing means, wherein the control means is responsive to cellular telephone data signals from the first connector to cause the dialing means to output telephone or ISDN dialing signals via the second connector.

8. An interface apparatus as in claim 5, wherein the first connector communicates with the mobile telephone via an electrical connection.

9. An interface apparatus as in claim 8, further comprising:
   power supply means for supplying electrical power to the mobile telephone through the first connector.

10. A mobile telephone for a cellular telephone system including:
   processing circuitry capable of sending and receiving baseband speech and data signals,
   an externally accessible connector for connecting the processing circuitry to the cellular telephone system through a communication path that is independent of the cellular telephone system's system of cells and that is other than RF, the externally accessible connector being coupled to the processing circuitry to exchange therewith baseband speech and data signals sent or received via the independent communication path,
   radio frequency transceiver circuitry for coupling to the processing circuitry to exchange baseband speech and data signals therewith, the processing circuitry including means for detecting whether the externally accessible connector is in communication with a complementary connector connected to the independent communication path,
   switch means under the control of the processing circuitry to disconnect the processing circuitry from the transceiver circuitry when the externally accessible connector is so connected, wherein the externally accessible connector communicates with the mobile telephone using an electrical connection,
   a power supply connection for supplying electrical power to the mobile telephone through the electrical connection, and
   radio frequency circuitry for transmitting and receiving speech and data signals, and
   wherein the switching means is responsive to a signal applied to disable the connector to the radio frequency circuitry.

11. A method of connecting a mobile telephone to the call-switching system of a cellular telephone system comprising the steps of:
   establishing an additional communication path, independent of the system of cells of the cellular telephone system, between the mobile telephone and a fixed part of the cellular telephone system, the additional communication path being other than RF,
   connecting the mobile telephone with an interface means, the interface means calling the call-switching system of the cellular telephone system via the communications path, and
   allocating, when the interface means calls the call-switching system, a dedicated channel for the mobile telephone on the switched network between the mobile telephone and the fixed part of the cellular radio system, such that all calls to and from the mobile telephone are routed via the dedicated channel,
   wherein the communications path comprises a switched network, and is a channel on an existing high bandwidth switched connection.

12. A method of connecting a mobile telephone to the call-switching system of a cellular radio system comprising the step of:
   establishing an additional communication path, independent of the system of cells of the cellular telephone system, between the mobile telephone and a fixed part of the cellular radio system,
   putting the mobile telephone in communication with an interface means, the interface means being connected to the call-switching system cellular telephone system by the communications path, wherein the communications path comprises a switched network, and
   allocating a path on the switched network between the mobile telephone and the fixed part of the cellular radio system, wherein the communications path is a channel on an existing high bandwidth switched connection, and
   wherein when a call ends, the switched connection is released only if both:
      no other channel of the switched connection is currently in use, and
      no further calls or call attempts are made to or from the mobile telephone within a predetermined period of the end of the call.

13. A method of connecting a mobile telephone to the telephone call-switching system of a cellular telephone system, the cellular telephone system further comprising a system of cells, each cell comprising a radio base system, the cellular telephone call switching system routing calls to radio base stations and, thus, to mobile telephones in radio communication with the radio base stations, the method comprising the steps of:
   establishing an additional communication path between the mobile telephone and the telephone call switching system, the additional communication path being other than RF;
   establishing in the switching system for the additional communication path a dedicated channel, not associated with a radio frequency channel, for connecting calls to and from the mobile phone,
   the additional communication path including an interface means for providing a switched connection between the mobile telephone and the cellular telephone call switching system, thereby by-passing the radio frequency circuitry and antenna of the mobile telephone, and
   wherein the communications path comprises a fixed point-to-point signal path.

14. A method of connecting a mobile telephone to the call-switching system of a cellular radio system comprising the steps of:
   establishing an additional communication path, independent of the system of cells of the cellular radio system, between the mobile telephone and a cellular radio base transceiver site of the cellular radio system,
   putting the mobile telephone in communication with an interface means connectable to the mobile telephone, the interface means being connected to the call-switching system cellular telephone system via the cellular radio base transceiver site by the communications path so as to by pass the radio frequency circuitry and antenna of the mobile telephone and the conventional wireless link to the cellular telephone system,
   wherein:
      the base transceiver site includes channel allocation means for allocating mobile telephones to channels in order to set up calls to and from said mobile telephones,
      when a call is set up to a mobile telephone by way of the system of cells, a channel is allocated having an associated radio frequency channel, selected from a plurality of channels allocated to the cell, when a call is set up to a mobile telephone by way of the additional communication path, the call is allocated to a dedicated channel not associated with such a radio frequency channel, and the interface means is programmed to contact the cellular radio base transceiver site when one of the mobile telephones is connected to the interface means, such that all calls to and from the mobile telephone are routed via the additional communication path.

15. A method of connecting a mobile telephone to the call-switching system of a cellular radio system comprising the steps of:

establishing an additional communication path, independent of the system of cells of the cellular telephone system, between the mobile telephone and a fixed part of the cellular radio system, the additional communication path being other than RF, and putting the mobile telephone in communication with an interface means, the interface means being connected to the call-switching cellular telephone system by the communications path and including a modem that provides a communications connection with the mobile telephone for radio frequency speech and data signals, wherein communication between the mobile telephone and the interface means disables the radio receiver functions of the mobile telephone, and wherein the interface means is programmed to contact the fixed part of the cellular radio system when the mobile telephone is connected to the interface means, such that all calls to and from the mobile telephone are routed via the additional communication path.

16. A cellular telephone system comprising:

a system of cells, each cell comprising a radio base station, a cellular telephone call switching system for routing calls to radio base stations, and, thus, to mobile telephones in radio communications with the radio base station, and an additional communication path connectable between a mobile telephone and the cellular telephone call switching system, the additional communication path including an interface apparatus connectable to one of said mobile telephones to provide a switched connection between the mobile telephone and the cellular telephone call switching system via a radio base station so as to bypass the radio frequency circuitry and antenna of the mobile telephone and the conventional wireless link to the cellular telephone system, wherein said interface apparatus is programmed to contact said radio base station when said one of said mobile telephones is connected to said interface apparatus, such that all calls to and from said one mobile telephone are routed via said additional communication path, and wherein the additional communication path comprises a dedicated channel in the cellular telephone call switching system not associated with a radio frequency channel, for connection of calls to and from mobile telephones.

17. A cellular telephone system as in claim 16, wherein the interface means communicates with the mobile telephone via an optical or ultrasonic communications link.

18. A cellular telephone system as in claim 16, wherein the interface means communicates with the mobile telephone via an electrical connection.

19. A cellular telephone system as in claim 16, wherein the interface means provides a communications connection to the mobile telephone for baseband speech and control data signals.

20. A cellular telephone system as in claim 19, wherein the interface means comprises a modem.

21. A cellular telephone system as in claim 16, wherein the interface means provides a communications connection with the radio frequency circuitry of a mobile telephone for radio frequency speech and data signals.

22. A cellular telephone system as in claim 21, wherein the communication path includes a transmission line and the interface means comprises means for connecting said radio frequency circuitry to the transmission line.

23. A cellular telephone system as in claim 22, wherein the communication path comprises:

a point-to-point microwave link and transposer means for transposing the signals on the transmission line to the operating band of the microwave link, and for transposing signals received from the microwave link to the operating band of the mobile telephone and applying them to the transmission line.

24. A method of connecting a mobile telephone to the telephone call-switching system of a cellular telephone system, the cellular telephone system further comprising a system of cells, each cell comprising a radio base station, the cellular telephone call switching system routing calls to radio base stations and, thus, to mobile telephones in radio communication with the radio base stations, the method comprising the steps of:

establishing an additional communication path between the mobile telephone and the cellular telephone call switching system;

establishing in the cellular telephone call switching system for the additional communication path a dedicated channel, not associated with a radio frequency channel, for connecting calls to and from the mobile phone, the additional communication path including an interface apparatus connectable to the mobile telephone for providing a switched connection between the mobile telephone and the cellular telephone call switching system via a radio base station, thereby bypassing the radio frequency circuitry and antenna of the mobile telephone and the conventional wireless link to the cellular telephone system wherein the interface apparatus is programmed to contact the radio base station when the mobile telephone is connected to the interface apparatus, such that all calls to and from the mobile telephone are routed via the additional communication path.

25. A method as in claim 24, wherein communication between the mobile telephone and the interface means is via an electrical connection.

26. A method as in claim 24, wherein the communication between the mobile telephone and the interface means is via an optical or ultrasonic carrier.

27. A method as in claim 24, wherein the communications path comprises a switched network, and the method comprises the step of:

allocating a path on the switched network between the mobile telephone and the fixed part of the cellular radio system.

28. A method as in claim 27, wherein a call is set up by setting up a switched connection.

* * * * *